(12) United States Patent
Didey et al.

(10) Patent No.: US 10,124,887 B2
(45) Date of Patent: Nov. 13, 2018

(54) LANDING GEAR DRIVE SYSTEM AND METHOD

(71) Applicant: AIRBUS OPERATIONS LIMITED, Bristol (GB)

(72) Inventors: Arnaud Didey, Bristol (GB); Fraser Wilson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 266 days.

(21) Appl. No.: 15/125,614

(22) PCT Filed: Mar. 13, 2015

(86) PCT No.: PCT/GB2015/050739
§ 371 (c)(1),
(2) Date: Sep. 13, 2016

(87) PCT Pub. No.: WO2015/136301
PCT Pub. Date: Sep. 17, 2015

(65) Prior Publication Data
US 2017/0001719 A1     Jan. 5, 2017

(30) Foreign Application Priority Data
Mar. 14, 2014    (GB) .................................. 1404607.2

(51) Int. Cl.
*B64C 25/40* (2006.01)
*B64C 25/34* (2006.01)

(52) U.S. Cl.
CPC ............ *B64C 25/405* (2013.01); *B64C 25/34* (2013.01); *Y02T 50/823* (2013.01)

(58) Field of Classification Search
CPC ......... B64C 25/34; B64C 25/405; F16H 1/06; Y10T 74/19684; Y02T 50/823
See application file for complete search history.

(56) References Cited

U.S. PATENT DOCUMENTS

| 5,247,847 A | 9/1993 | Gu |
| 2006/0065779 A1 | 3/2006 | McCoskey et al. |

(Continued)

FOREIGN PATENT DOCUMENTS

| WO | 0146605 A1 | 6/2001 |
| WO | 2011023505 A2 | 3/2011 |

(Continued)

OTHER PUBLICATIONS

Hiroshi Honda and Hiroshi Makino, "Research on the Trochoidal Gears (1st Report): Classification and Basic Formulas of the Trochoidal Gears". Translation of Journal of the Japan Society for Precision Engineering, 1994, vol. 60, No. 7, p. 949-953.

(Continued)

*Primary Examiner* — Valentina Xavier
(74) *Attorney, Agent, or Firm* — Nixon & Vanderhye, PC

(57) ABSTRACT

A drive system for a landing gear is disclosed having a wheel rotatable about a wheel axis, the a drive assembly comprising an input gear rotatable about an input axis by an input shaft, an engagement assembly comprising a first intermediate gear meshed with the input gear and rotatable about a first intermediate axis by a first intermediate shaft, and a first drive pinion mounted on the first intermediate shaft and arranged to rotate in tandem with the first intermediate gear, the engagement assembly being pivotable about the input shaft relative to the drive assembly. A locking device is engageable to prevent rotation of the first intermediate gear about the first intermediate axis. The drive system also comprises a driven gear is configured to be attached to the wheel so as to be capable of rotating the wheel about the wheel axis.

15 Claims, 6 Drawing Sheets

(56) References Cited

U.S. PATENT DOCUMENTS

| | | | | |
|---|---|---|---|---|
| 2012/0153075 A1* | 6/2012 | Wilson | ................ | B64C 25/405 |
| | | | | 244/50 |
| 2012/0217339 A1 | 8/2012 | Gilleran et al. | | |
| 2012/0312112 A1 | 12/2012 | Tizac | | |
| 2013/0200210 A1* | 8/2013 | Oswald | ................ | B64C 25/405 |
| | | | | 244/50 |
| 2014/0158820 A1* | 6/2014 | Wilson | ................ | B64C 25/405 |
| | | | | 244/50 |
| 2014/0225421 A1* | 8/2014 | Oswald | ................ | B64C 25/405 |
| | | | | 301/6.2 |
| 2014/0245853 A1 | 9/2014 | Didey | | |
| 2015/0210385 A1 | 7/2015 | Didey | | |
| 2015/0314862 A1* | 11/2015 | Blanc | ................ | B64C 25/405 |

FOREIGN PATENT DOCUMENTS

| | | | |
|---|---|---|---|
| WO | 2011134503 | A1 | 11/2011 |
| WO | 2012071456 | A2 | 5/2012 |
| WO | 2014023939 | A1 | 2/2014 |
| WO | 2014023941 | A1 | 2/2014 |

OTHER PUBLICATIONS

Hiroshi Honda, "Research on the Trochoidal Gears (2nd Report): Pressure Angle of Trochoidal Gears and Modification of Tooth Profile". Translation of Journal of the Japan Society for Precision Engineering, 1995, vol. 61, No. 2, p. 208-212.
International Search Report and Written Opinion of the ISA dated May 29, 2015 International Application No. PCT/GB2015/050739.

* cited by examiner

LANDING GEAR DRIVE SYSTEM AND METHOD

RELATED APPLICATIONS

The present application is a National Phase of International Application Number PCT/GB2015/050739, filed Mar. 13, 2015, which claims priority from Great Britain Application Number 1404607.2, filed Mar. 14, 2014.

FIELD OF THE INVENTION

The present invention relates to a drive system and method for rotating one or more wheels of an aircraft landing gear for the purposes of ground taxiing, in which a separate clutch is not needed.

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

There is therefore a need for a drive system to power the wheels of an aircraft landing gear during ground taxi operations.

Several autonomous ground taxi systems have been proposed in recent years. An example is disclosed in US2006/0065779, which proposes a powered nose aircraft wheel system in which a clutch is used to switch between a mode in which the wheel can spin freely and a mode in which the wheel can be driven by an electric motor.

US2012/0312112 discloses a motorised mechanism for an aircraft landing gear wheel comprising a declutchable interface between the motorised mechanism and the wheel.

SUMMARY OF THE INVENTION

A first aspect of the invention provides a drive system for a landing gear having a wheel rotatable about a wheel axis, the drive system including:
  a drive assembly comprising an input gear rotatable about an input axis by an input shaft;
  an engagement assembly comprising a first intermediate gear meshed with the input gear and rotatable about a first intermediate axis by a first intermediate shaft, and a first drive pinion mounted on the first intermediate shaft and arranged to rotate in tandem with the first intermediate gear, the engagement assembly being pivotable about the input shaft relative to the drive assembly;
  a locking device which is engageable to prevent rotation of the first intermediate gear about the first intermediate axis; and
  a driven gear configured to be attached to the wheel so as to be capable of rotating the wheel about the wheel axis,
wherein:
  the drive system is arranged to move from a neutral configuration, in which the first drive pinion is not meshed with the driven gear and the locking device is engaged, to a first driven configuration, in which the first drive pinion is meshed with the driven gear and the locking device is disengaged, upon pivoting of the engagement assembly about the input shaft in a first direction in response to application of a torque to the input shaft in the first direction; and
  one of the first drive pinion and the driven gear comprises a sprocket and the other of the first drive pinion and the driven gear comprises a series of rollers arranged to form a ring, each roller being rotatable about a roller axis at a fixed distance from an axis of rotation of the drive pinion or driven gear, respectively.

In this way, the drive system can be moved from a neutral configuration, in which there is no connection between the drive system and the landing gear wheel so that the wheel can rotate freely (e.g. during take-off or landing), to a driven configuration, in which the drive system can rotate the wheel (e.g. during ground taxiing operations), simply by applying a torque to the input gear, via the input shaft. There is therefore no need for a separate device or mechanism for moving the drive pinion into engagement with the driven gear, and therefore no need to maintain such a device or mechanism. The risk of malfunction of the drive system is likewise reduced.

A key advantage of achieving the motor-wheel connection via a sprocket and series of rollers arranged in a ring is that such a mechanism is inherently robust and tolerant of environmental contamination. Thus, it may not be necessary to enclose the drive system within a casing to prevent ingress of debris and other contaminants. In contrast, drive system arrangements employing meshing toothed gears, such as that disclosed in WO2011/023505, must be suitably protected from contaminants, the required protective casing adding both weight and expense, and making routine inspection difficult.

Another advantage of the sprocket-roller arrangement is that it is more tolerant of wheel deformation and misalignment between pinion and driven gear than meshing toothed gear arrangements. Landing gear wheels are subject to high loads and consequential deformation during ground taxiing, and a driven gear fixed to the wheel will inevitably deform in response to such wheel deformation. Moreover, such loads may introduce misalignment between the wheel and the drive system. Meshing toothed gears are intolerant of such deformation and a typical toothed rim gear may need to be isolated from the wheel via bearings, a flexible interface, or similar. In contrast, the sprocket and roller arrangement of the present invention may be able to tolerate the deformation without such modification.

A further advantage is a roller gear—sprocket transmissions are subject to less wear than equivalent toothed spur gear transmissions, since the engagement is provided by a rolling contact rather than a sliding contact.

In some embodiments the series of rollers may be provided by a roller gear. Thus, each of the series of rollers may be rotatable about a pin, the pins optionally being supported by an annular support member, or between two annular support members. Such an arrangement has the advantage of being lightweight and having high structural strength. Optionally, the roller gear may comprise a bush between each roller and pin.

In other embodiments the series of rollers may be provided by a roller chain (also known as an attachment chain, or attachment roller chain) extending around an outer circumference of a support member and being fixed thereto. This arrangement may be less expensive to implement than the roller gear arrangement discussed above. Roller chains are typically utilised so that they extend around one or more sprocket wheels so that the chain is movable relative to those sprocket wheels. By arranging the roller chain so that it is fixed to the support member the roller chain is not required to flex (i.e. there is no relative movement between neighbouring links) and thus the chain is subject to less wear. This in turn leads to a longer useful life of the chain and reduced maintenance costs. Moreover, the roller chain is less likely to become detached from the support member in the event of a failure. However, a small risk of chain detachment remains, making roller chain embodiments potentially less preferred than roller gear embodiments.

The driven gear preferably has a larger diameter than the drive pinion. This arrangement provides for a torque-magnifying gear ratio and an efficient use of space.

In some embodiments the engagement assembly includes:
a second intermediate gear meshed with the input gear and rotatable about a second intermediate axis by a second intermediate shaft; and
a second drive pinion mounted on the second intermediate shaft and rotatable in tandem with the second intermediate gear, one of the second drive pinion and the driven gear comprising a sprocket and the other of the first drive pinion and the driven gear comprising a series of rollers arranged to form a ring, each roller being rotatable about a roller axis at a fixed distance from an axis of rotation of the second drive pinion or driven gear, respectively,
wherein the locking device is engageable to prevent rotation of the second intermediate gear about the second intermediate axis, and the drive system is arranged to move from the neutral configuration to a second driven configuration, in which the second drive pinion is meshed with the driven gear and the locking device is disengaged, upon the pivoting of the engagement assembly in a second direction opposite to the first direction in response to application of a torque to the input shaft in the second direction.

Such an arrangement enables the drive system to provide both forward motion and reverse motion, or forward motion and braking. Forward motion can be achieved simply by applying a torque to the input gear in one direction (either the first or second direction, according to the application), while reverse motion, or braking, can be achieved simply by applying a torque to the input gear in the opposite direction.

The drive system may include a resilient member (e.g. a spring) arranged to bias the engagement assembly to the neutral configuration. Thus, the drive system remains disengaged from the wheel unless it is required for use during ground taxiing operations.

The resilient member may be arranged to limit an amount by which the engagement assembly can pivot about the input shaft. Preferably, however, the drive system comprises one or more stop members arranged to limit an amount by which the engagement assembly can pivot about the input shaft. It is desirable to limit such pivoting in order to better control the distance between the rotational centres of the driven gear and the first or second drive pinion. That is, limiting the amount of pivoting of the engagement assembly prevents the distance between the rotational centres of these gears from shortening to the extent that a roller of the roller gear becomes trapped (bottoms out) in a trough between teeth of the sprocket. The one or more stop members may be adjustable to vary the limit of pivoting of the engagement assembly.

The locking device may be engageable with the engagement assembly to prevent rotation of the first or second intermediate gears, or the input gear. It may further comprise an engagement member arranged to engage (one or more teeth of) the first pinion gear. Thus, the locking device may be external to the engagement assembly and not enclosed with it.

The locking device is preferably arranged to automatically disengage from the engagement assembly in the first driven configuration, and optionally the second driven configuration. The locking device is also preferably arranged to automatically engage the engagement assembly in the neutral configuration. In this way there is no requirement for any separate operations to engage or disengage the locking device; application of the torque to the input gear is the only operation required.

The locking device is preferably adjustable to control the timing of the automatic disengagement from the engagement assembly. It is important to control the disengagement so that it occurs once the first or second pinion gear has meshed with the driven gear, to prevent a mechanical jam or lock-up.

In preferred embodiments the locking device comprises a mechanical locking device that mechanically engages with the engagement assembly (e.g. the first or second intermediate gears). However, the locking device may alternatively be a device which engages with the input shaft to prevent rotation thereof. For example, the locking device may comprise a brake, clutch or torque limiter engageable with the input shaft to prevent rotation thereof.

In some embodiments the resilient member comprises a leaf spring having a proximal end attached to the drive assembly and a distal end attached to the engagement assembly. The leaf spring thus both biases the engagement assembly to the neutral configuration and limits the amount by which the engagement assembly can pivot relative to the drive assembly.

The distal end of the leaf spring is preferably attached to the engagement assembly by a coupling which permits sliding of the distal end relative to the engagement assembly. The locking device preferably comprises a lever having a first end connected to the distal end of the leaf spring, a second end arranged to engage one or more teeth of the first pinion gear, and a pivot connection between the lever and the engagement assembly, whereby the pivot connection is arranged to permit pivoting of the lever relative to the engagement assembly in response to sliding of the distal end relative to the engagement assembly. Thus, the locking device can be automatically engaged and disengaged in response to pivoting of the engagement assembly between the neutral and driven configurations.

The input gear, first intermediate gear, and optionally the second intermediate gear are preferably enclosed within casing, whereas the driven gear, first drive pinion, and optionally the second drive pinion are not enclosed within a casing. Such an arrangement makes it possible to protect the toothed gears from environmental debris and other contamination, while exposing the roller gear and sprocket.

A second aspect of the invention provides an aircraft landing gear having a wheel and a drive system according to the first aspect, wherein the driven gear of the drive system is attached to the wheel so that the wheel is arranged to rotate in tandem with the driven gear.

A third aspect of the invention provides a method of operating a drive system to rotate a wheel of a landing gear about a wheel axis, the drive system including: a drive assembly including an input gear rotatable about an input axis by an input shaft; an engagement assembly including a first intermediate gear meshed with the input gear and rotatable about a first intermediate axis by a first intermediate shaft and a first drive pinion mounted on the first intermediate shaft and arranged to rotate in tandem with the first intermediate gear, the engagement assembly being pivotable about the input shaft relative to the drive assembly; a locking device which is engageable to prevent rotation of the first intermediate gear about the first intermediate axis; and a driven gear attached to the wheel so as to be capable of rotating the wheel about the wheel axis, wherein one of the first drive pinion and the driven gear comprises a sprocket and the other of the first drive pinion and the driven gear comprises a series of rollers arranged to form a ring, each roller being rotatable about a roller axis at a fixed distance from an axis of rotation of the drive pinion or driven gear, respectively, the method including the steps of:
  engaging the locking device to prevent rotation of the first intermediate gear about the first intermediate axis;
  applying a torque to the input gear in a first direction to thereby pivot the engagement assembly about the input axis in the first direction to a position in which the first pinion gear is meshed with the driven gear and the locking device is disengaged; and
  continuing to apply the torque to the input gear in the first direction to rotate the driven gear in the first direction and thereby rotate the wheel about the wheel axis in the first direction.

This method provides the same advantages as discussed above in relation to the first aspect.

The method may further include the step of either stopping applying a torque to the input gear in the first direction or applying a torque to the input gear in a second direction opposite to the first direction, so that the engagement assembly pivots about the input axis in the second direction and the first pinion gear is no longer meshed with the driven gear. Thus, return to the neutral configuration can be achieved simply by ceasing to apply any torque or applying a torque to the input gear in the opposite direction to the direction of motion. When no torque is applied to the input shaft the engagement assembly may automatically pivot so that the first pinion gear is no longer meshed with the driven gear by the biasing action of a resilient member (e.g. a spring) acting to bias the engagement assembly towards the neutral configuration.

The engagement assembly may further include: a second intermediate gear meshed with the input gear and rotatable about a second intermediate axis by a second intermediate shaft; and a second drive pinion mounted on the second intermediate shaft and rotatable with the second intermediate gear, one of the second drive pinion and the driven gear comprising a sprocket and the other of the first drive pinion and the driven gear comprising a series of rollers arranged to form a ring, each roller being rotatable about a roller axis at a fixed distance from an axis of rotation of the second drive pinion or driven gear, respectively, and the method may further include the steps of:
  engaging the locking device to prevent rotation of the second intermediate gear about the second intermediate axis;
  applying a torque to the input gear in a second direction opposite to the first direction to thereby pivot the engagement assembly about the input axis in the second direction to a position in which the second pinion gear is meshed with the driven gear and the locking device is disengaged; and
  continuing to apply the torque to the input gear in the second direction to rotate the driven gear in the second direction and thereby rotate the wheel about the wheel axis in the second direction.

In this way, the drive system can be operated to achieve both forward and reverse motion of the landing gear wheel.

All of the optional or desirable features of the various aspects of the invention described herein can be applied to any relevant aspect, either singly or in any combination.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
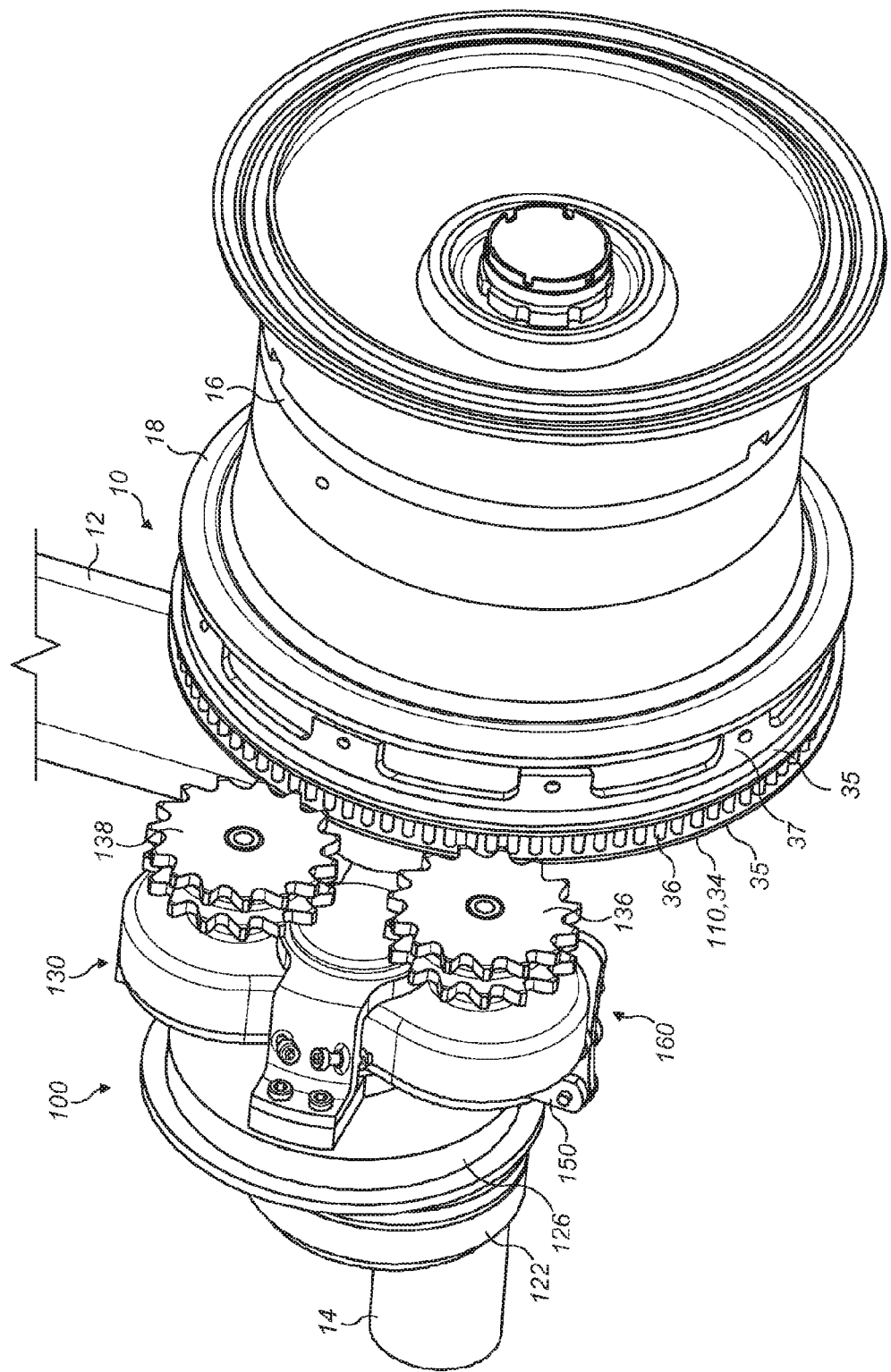
FIG. 1 shows an isometric view of a drive system according to an embodiment of the present invention installed on an aircraft landing gear.

FIGS. 1 to 8 show an embodiment of a drive system according to the invention. FIG. 1 shows the drive system in situ on the landing gear of an aircraft, while the remaining figures omit the landing gear for clarity.

In the illustrated embodiment the landing gear has two wheels, but the principles of the embodiment may be applied to landing gear with four or more wheels. The embodiment shows a main landing gear (i.e. a landing gear attached to wing structure or fuselage structure in the region of the centre of gravity of the aircraft and/or in the region of the wings), since the weight supported by the main landing gear is considered to provide the best traction between the wheels and the ground to enable reliable aircraft ground taxiing. However, the drive system of the present invention may alternatively be applied to a nose landing gear (i.e. a steerable landing gear towards the nose of the aircraft).

The landing gear 10 includes a telescopic shock-absorbing main leg 12, including an upper telescopic part (main fitting) and a lower telescopic part (slider). The upper telescopic part is attached to the aircraft fuselage or wing (not shown) by its upper end (not shown). The lower telescopic part supports an axle 14 carrying a pair of wheels 16, one on either side of the main leg (only one wheel 16 is shown, for clarity). The wheels 16 are arranged to rotate about the axle 14 to enable ground movement of the aircraft, such as taxiing or landing. Each wheel 16 comprises a tyre (not shown) supported by a rim 18 (also known as a hub).

The drive system 100 includes a driven gear 110 which is attached to the hub 18 so as to be rotatable with the wheel 16, the driven gear 110 comprising a roller gear 34 formed by two rigid annular rings 35 connected together by a series of rollers 36 extending around the rings to form a continuous track. The rollers 36 are each rotatable about a pin (not shown) which extends between the annular rings 35 to form a rigid connection between the annular rings 35. One of the annular rings 35 comprises a plurality of connection extension tabs 37 which provide a rigid connection to the hub 18 of the wheel. In alternative embodiments the connection to the wheel 16 may be via a flexible interface permitting limited relative movement, or distortion, between the driven gear and the wheel. A suitable roller gear is a dual row pin gear drive unit no PDU35, supplied by Tsubaki™.

The drive system 100 also includes a drive train 120, which includes a motor 122 which rotates a drive shaft 124 via a gearbox 126. The motor 122 and gearbox 126 are housed within a casing which protects them from environmental hazards such as debris. The casing is connected to the axle 14 of the landing gear 10 such that the drive train 120 is attached to the axle 14. In some embodiments the connection may be via a passive or active mounting in order that limited movement of the drive train 120 is permitted to isolate the drive train from vibrations. Mounted on the drive shaft 124 is an input gear 128 which comprises a toothed spur gear.

The drive system 100 also includes an engagement assembly 130, which is able to pivot relative to the drive train 120 about the drive shaft 124. The primary connection between the engagement assembly 130 and the drive train 120 is via the input gear 128, which is meshed with a first intermediate gear 132 and second intermediate gear 134 of the engagement assembly. The first 132 and second 134 intermediate gears are toothed spur gears which are positioned either side of the input gear 128 and are mounted on first 133 and second 135 intermediate shafts, respectively. Also mounted on the first 133 and second 135 intermediate shafts are first 136 and second 138 drive pinions, respectively, which each comprise a sprocket arranged to be capable of meshing with the roller gear 34 of the driven gear 110. The first drive pinion 136 thus rotates in tandem with the first intermediate gear 132, and the second drive pinion 138 rotates in tandem with the second intermediate gear 134.

The secondary connection between the engagement assembly 130 and the drive train 120 is via a pair of leaf springs 150 which each have a distal end rigidly fixed to the drive train 120 casing, and a proximal end slidably connected to the casing of the engagement assembly 130. The connection to the engagement assembly 130 casing is via a pair of rollers 152 which are fixed at one end thereof to the casing and which sandwich the distal end of the leaf spring 150 between them. The distal end is thus able to slide between the rollers 152. The springs 150 act to bias the engagement assembly 130 towards a neutral configuration (shown in FIG. 5) in which neither the first drive pinion 136 nor the second drive pinion 138 is meshed with the driven gear 110.

Figure 7:
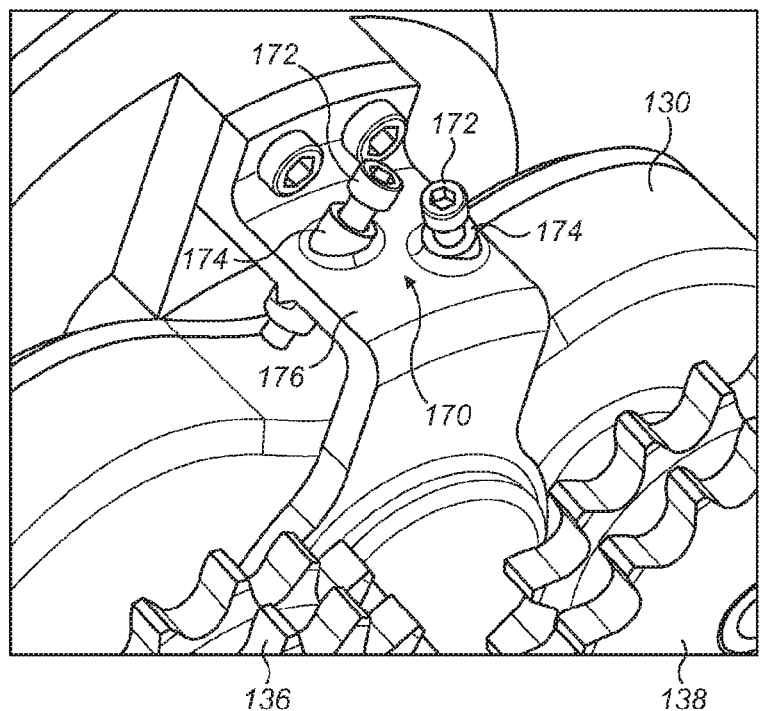
FIG. 7 shows a detail view of the adjustable stops of the drive system of FIGS. 1 to 6.
Figure 8A:
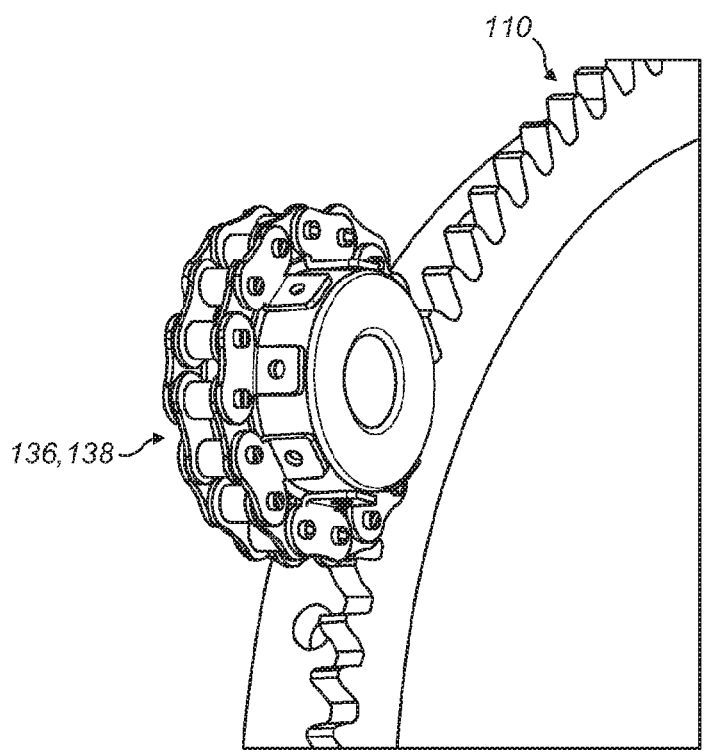
FIGS. 8A-C show variations of the illustrated embodiments in which the drive pinion comprises a roller gear and the driven gear comprises a sprocket.
Figure 8B:
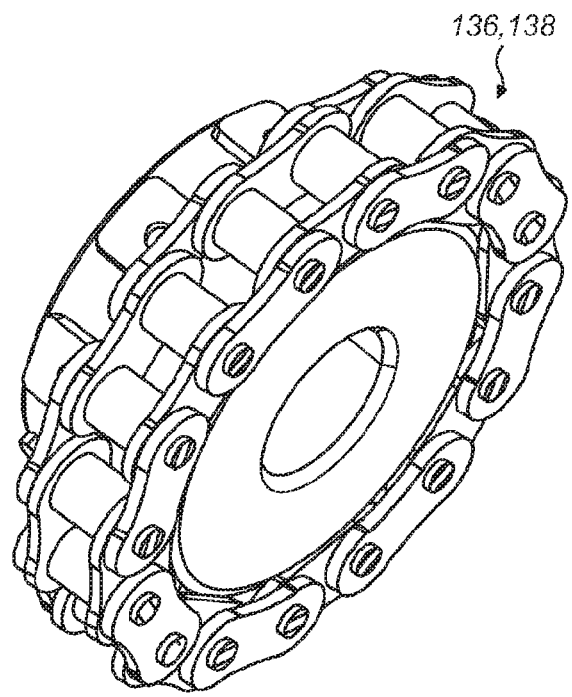
Figure 8C:
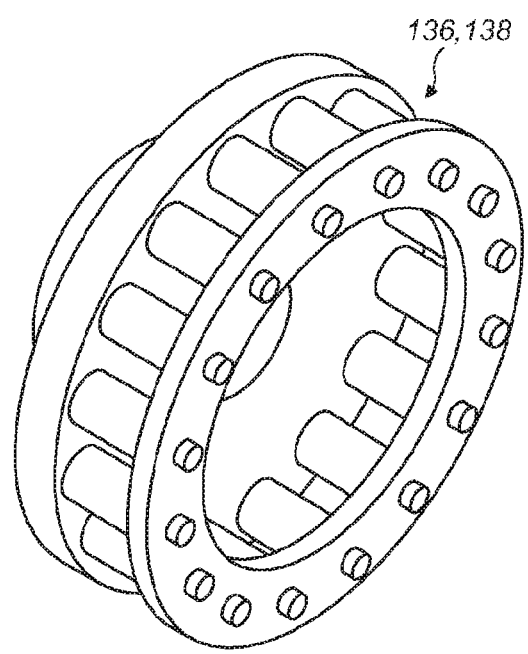

The amount by which the engagement assembly 130 can pivot with respect to the drive train 120 is limited by adjustable stops 170, seen best in FIG. 7. The stops 170 comprise two threaded screws 172 which each cooperate with a corresponding threaded bore 174 through a support bracket 176 of the drive system. The screws 172 can each be adjusted within their respective bore 174 to control how far the tail of the screw protrudes from the bracket 176. The tail of each screw provides a physical stop which abuts the casing of the engagement assembly 130 upon pivoting of the engagement assembly 130 to a sufficient degree. Thus, adjustment of the position of the screw 172 within the bore 174 controls the position of the tail and thus the amount of permitted pivoting of the engagement assembly 130. As can be seen from FIG. 7, one screw 172 provides a stop for pivoting in the first direction and the other screw provides a stop for pivoting in the second direction. By controlling the amount by which the engagement assembly 130 can pivot, the distance between the rotational centres of the driven gear 110, 34 and the first 136 or second 138 drive pinions when meshed can be controlled.

Figure 5:
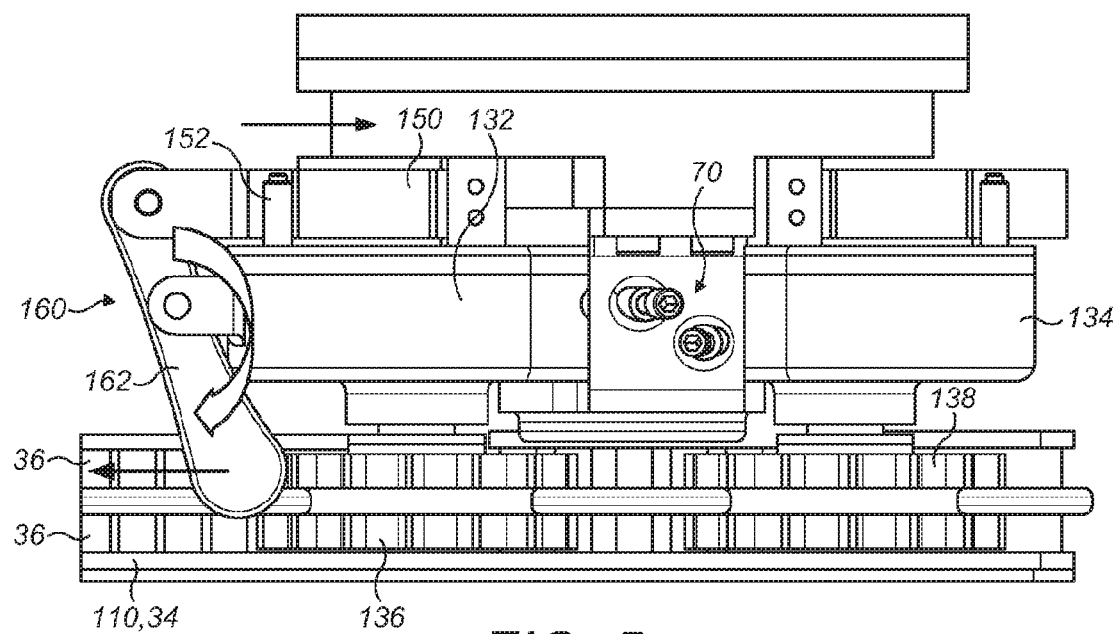
FIG. 5 shows an annotated detail view of the locking device of the drive system of FIGS. 1 to 4.
Figure 6:
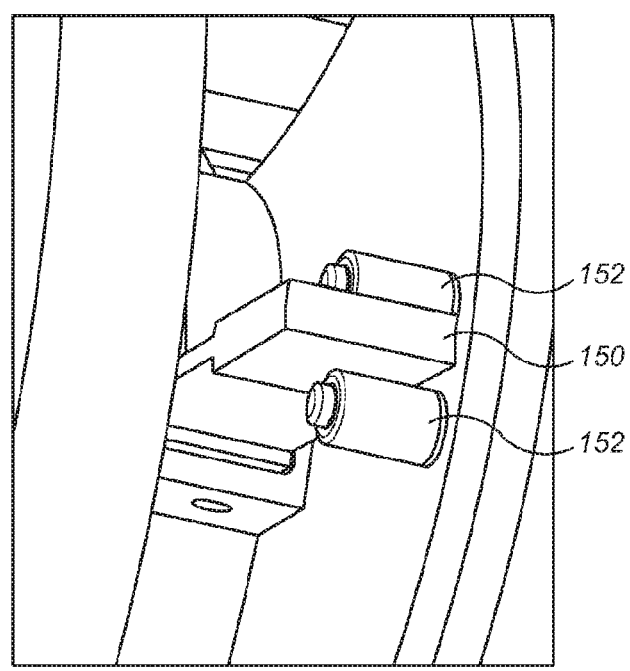
FIG. 6 shows a detail view of the leaf spring of the drive system of FIGS. 1 to 5.

As shown most clearly in FIG. 5, a locking device 160 can be engaged with the first drive pinion 136 to prevent rotation of that pinion about its axis, and thus also to prevent rotation of the first intermediate gear 132, input gear 128 and second intermediate gear 134. The locking device 160 includes a lever 162 which is pivotally connected at one end to the distal end of the respective leaf spring 150 and at a mid point to the casing of the engagement assembly 130. The other end of the lever 162 is configured for engagement with the first drive pinion 136. As indicated by the arrows in FIG. 5, the lever 152 thus pivots about its connection with the engagement assembly 130 casing as the distal end of the leaf spring 150 slides relative to the engagement assembly 130. The locking device 160 and leaf spring 150 are configured so that the lever 152 engages the first drive pinion 136 when the engagement assembly is in the neutral configuration (FIG. 5), and disengages as the engagement assembly 130 pivots with respect to the drive train 120 and the distal end of the leaf spring 150 slides relative to the rollers 152.

The drive train 120 and engagement assembly 130 also include various other components and features which will not be described in detail here, including multiple roller bearings and/or bushes for supporting rotating shafts, and seals to seal the casings of the motor, drive train and engagement assembly at the points at which the rotating shafts pass through those casings.

The operation of the drive system 100 will now be described.

When the drive system 100 is not in operation the engagement assembly 130 is biased by the leaf springs 150 to the neutral configuration (FIG. 2) in which its position relative to the drive train 120 is such that neither the first drive pinion 136 nor the second drive pinion 138 is able to mesh with the driven gear 110. In this configuration the lever 162 of the locking device 160 is engaged with the first drive pinion 136 to prevent it from rotating about its axis.

Figure 2:
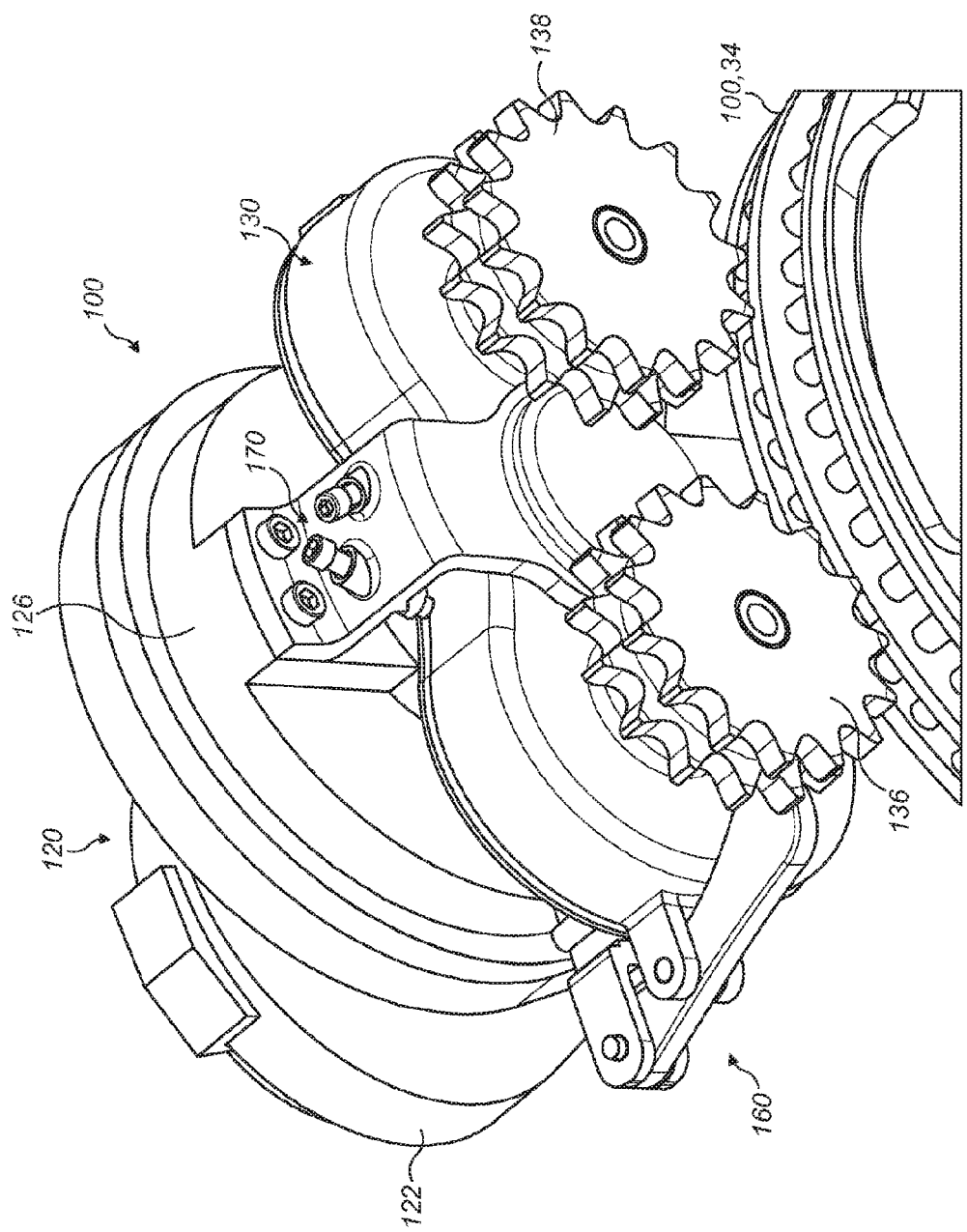
FIG. 2 shows an alternative isometric view of the drive system 1.

To operate the drive system 100 to provide forward motion, the motor 122 is activated to apply torque to the drive shaft 124—and thus to the input gear 128—in a first direction (anti-clockwise as shown in FIG. 2). Since the input gear 128 is meshed with the first intermediate gear 132, the torque is transferred to the first intermediate gear 132. Because the first drive pinion 134 is engaged by the locking device 160, however, the first intermediate shaft 133 and first intermediate gear 132 are prevented from rotating about the shaft axis. Instead, the torque causes the engagement assembly 130 to pivot in the first direction about the drive shaft 124 relative to the drive train 120. As the engagement assembly 130 pivots, the distal end of the leaf spring 150 slides relative to the rollers 152 and the lever 152 thus pivots about its connection with the engagement assembly 130 casing.

Gradually, the engagement assembly 130 pivots to a position in which the first drive pinion 134 is meshed (engaged) with the driven gear 110. As the engagement assembly 130 pivots, the lever 152 gradually disengages from the first drive pinion 132, eventually reaching a point at which there is only partial engagement so that the lever 152 can slip between teeth of the first drive pinion 134 to a limited extent. Thus, some limited ratcheting of the first drive pinion 134 relative to the driven gear 110 (play) is permitted, to enable a good mesh between the first drive pinion 134 and driven gear 110 to be ultimately achieved.

Once the first drive pinion 134 and driven gear 110 are fully meshed, the lever 152 fully disengages from the first drive pinion 132 and the torque from the drive shaft 124 causes the first drive pinion 132 to rotate about the shaft axis in a second direction opposite to the first direction (clockwise as shown in FIG. 2). The meshing between the first drive pinion 134 and the driven gear 110 thus causes the wheel 16 to rotate in the first direction (anti-clockwise as shown in FIG. 2) to move the aircraft forwards. The meshing engagement is maintained because the resultant force derived from the engagement between the first drive pinion 134 and the driven gear 110 provides a moment about the axis of the drive shaft 124 in the first direction, which thus serves to urge the drive pinion 134 towards the driven gear 110. That is, the resultant force has a direction vector which passes between the axis of the drive shaft 124 and the axis of the driven gear 110 (or wheel 16). If the direction vector of the resultant force instead passed to the other side of the drive shaft 124 axis, i.e. no that the drive shaft 124 axis falls between the direction vector and the axis of the driven gear 110, then the meshing engagement would not be maintained.

To return to the neutral position the motor 122 is stopped so that it is no longer applying torque to the drive shaft 124. The resultant forces between the teeth of the input gear 128 and first intermediate gear 132 cause these gears to become unmeshed, and the biasing action of the leaf springs 150 causes the engagement assembly 130 to pivot relative to the drive train 120 in the second direction to return to the neutral configuration. Alternatively, the motor 122 can be driven in the second direction (i.e. opposite to the first direction) to achieve the same effect of causing the input gear 128 and first intermediate gear 132 to become unmeshed.

To operate the drive system 100 to provide reverse motion, the steps above for forward motion are repeated but in the opposite directions. Thus, the motor 122 is activated to apply torque to the drive shaft 124 and the input gear 128 in the second direction (clockwise as shown in FIG. 2), which causes pivoting of the engagement assembly 130 relative to the drive train 120 about the drive shaft 124 in the second direction. As the engagement assembly 130 pivots, the distal end of the leaf spring 150 slides relative to the rollers 152 and the lever 152 thus pivots about its connection with the engagement assembly 130 casing. The operation of the drive system 100 in reverse, as described above, can also be used to provide a braking effect when the aircraft is travelling forwards.

Gradually, the engagement assembly 130 pivots to a position in which the second drive pinion 136 is meshed (engaged) with the driven gear 110. As the engagement assembly 130 pivots, the lever 152 gradually disengages from the first drive pinion 132, eventually reaching a point at which there is only partial engagement so that the lever 152 can slip between teeth of the first drive pinion 134 to a limited extent. Thus, some limited ratcheting of the second drive pinion 136 relative to the driven gear 110 (play) is permitted, to enable a good mesh between the second drive pinion 136 and the driven gear 110 to be ultimately achieved.

Figure 3:
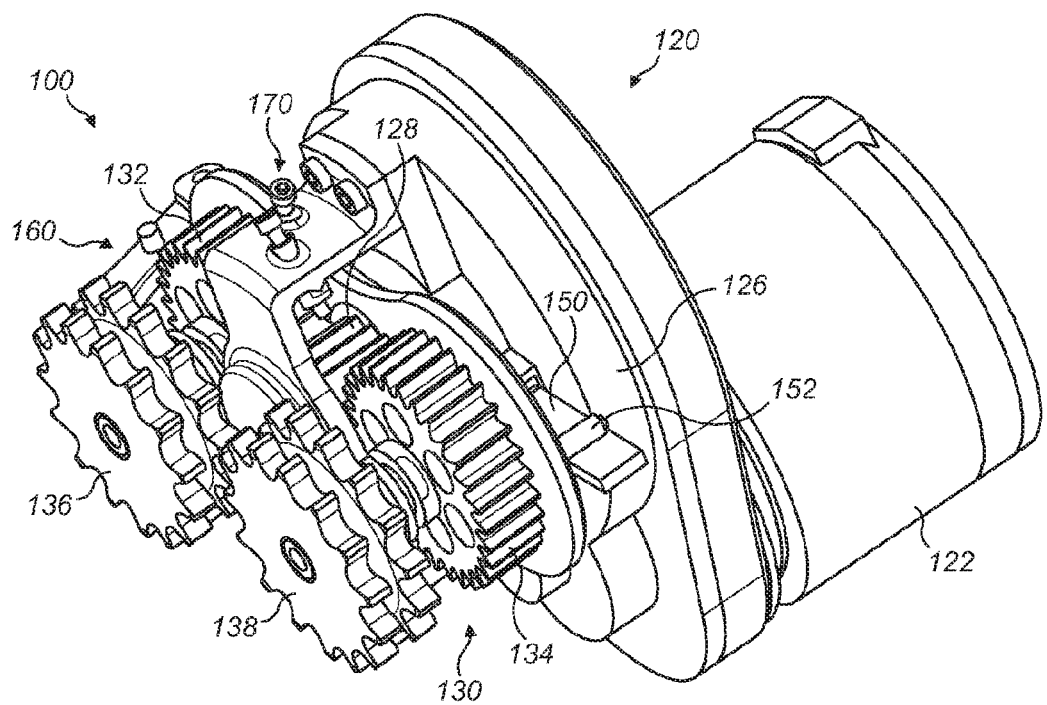
FIG. 3 shows an isometric view of the drive system of FIGS. 1 and 2, with the protective cover of the engagement assembly omitted for clarity.
Figure 4:
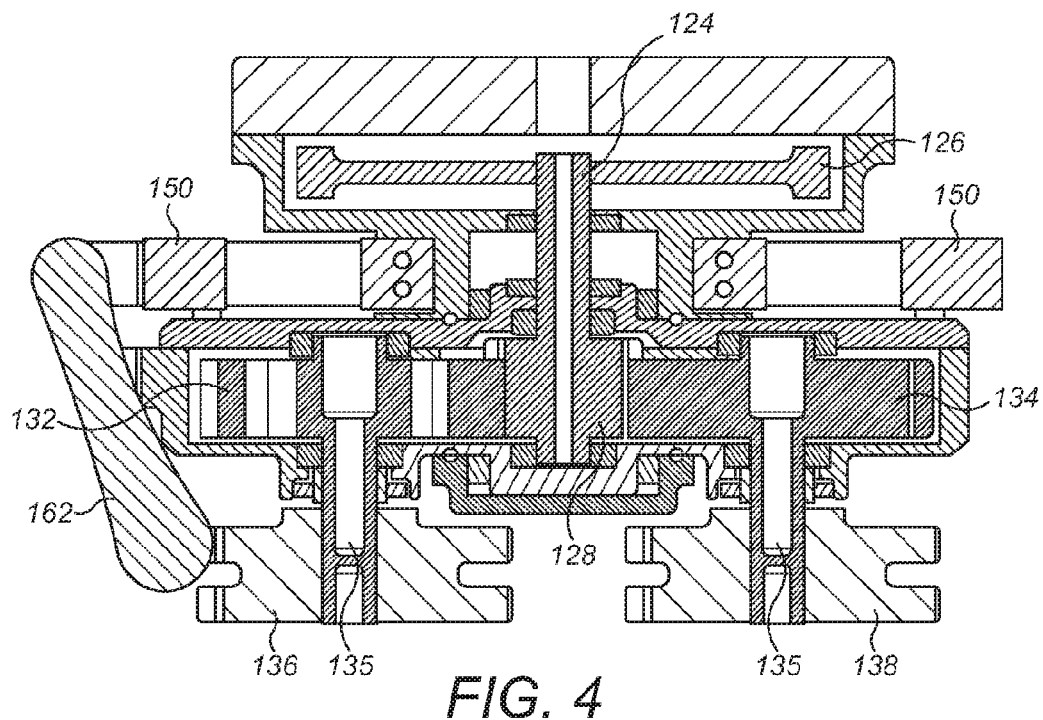
FIG. 4 shows a cross sectional view of the drive system of FIGS. 1 to 3.

Once the second drive pinion 136 and driven gear 110 are fully meshed, the lever 152 disengages from the first drive pinion 132 and the torque from the drive shaft 124 causes the second drive pinion 136 to rotate about the shaft axis in the first direction (anti-clockwise as shown in FIG. 3). The meshing between the second drive pinion 136 and the driven gear 110 thus causes the wheel 16 to rotate in the second direction (clockwise as shown in FIG. 2) to move the aircraft backwards. In a similar manner to the first drive pinion 134 and the driven gear 110, the meshing engagement between the second drive pinion 136 and the driven gear 110 is maintained because the resultant force derived from the engagement between them provides a moment about the axis of the drive shaft 124 in the second direction, which thus serves to urge the second drive pinion 136 towards the driven gear 110. That is, the resultant force has a direction vector which passes between the axis of the drive shaft 124 and the axis of the driven gear 110 (or wheel 16). If the direction vector of the resultant force instead passed to the other side of the drive shaft 124 axis, i.e. so that the drive shaft 124 axis falls between the direction vector and the axis of the driven gear 110, then the meshing engagement would not be maintained.

In FIGS. 1 to 8 the first and second drive pinions 132, 134 are in the form of a sprocket and the driven gear 110 is in the form of a roller gear. As illustrated in FIGS. 8A to 8C, in other embodiments the first and second pinion gears may each comprise a roller gear (either a single or double roller gear) and the driven gear may comprise a socket (either a single or double sprocket). FIGS. 8A and 8B show alternative forms of a roller gear in which a roller chain is wrapped around and fixed to a cylindrical base. FIG. 8C shows a more typical roller gear, similar to the one described above in relation to FIGS. 1 to 7.

Although the illustrated embodiments show the two intermediate gears as similarly sized, in some embodiments these gears may have different sizes in order to provide different gearing ratios for forward and reverse motion.

In some embodiments it may be necessary to include one or more dampers (not shown) in addition to the biasing springs.

In the embodiments illustrated in FIGS. 1 to 8 there are two pinion gears in order that one pinion gear can be used to generate forward motion of the aircraft and the other pinion gear can be used to generate reverse motion. In some embodiments it may only be necessary to generate motion in one direction, and such embodiments will therefore include only one pinion gear.

FIGS. 1 to 7 show the first and second pinion gears in the form of a double sprocket having two identical sets of teeth separated by an axial gap and the driven gear in the form of a double roller gear having two identical series of rollers to form two parallel tracks. In some embodiments the neighbouring teeth/rollers may be out of phase from one another. In other embodiments each sprocket may comprise only a single sprocket with one set of teeth, and each roller gear may comprise only a single roller gear with a single series of rollers.

Although the invention has been described above with reference to one or more preferred embodiments, it will be appreciated that various changes or modifications may be made without departing from the scope of the invention as defined in the appended claims.

The invention claimed is:

1. A drive system for a landing gear having a wheel rotatable about a wheel axis, the drive system including:
   a drive assembly comprising an input gear rotatable about an input axis by an input shaft;
   an engagement assembly comprising a first intermediate gear meshed with the input gear and rotatable about a first intermediate axis by a first intermediate shaft, and a first drive pinion mounted on the first intermediate shaft and arranged to rotate in tandem with the first intermediate gear, the engagement assembly being pivotable about the input shaft relative to the drive assembly;
   a locking device which is engageable to prevent rotation of the first intermediate gear about the first intermediate axis; and
   a driven gear configured to be attached to the wheel so as to be capable of rotating the wheel about the wheel axis,
   wherein:
   the drive system is arranged to move from a neutral configuration, in which the first drive pinion is not meshed with the driven gear and the locking device is engaged, to a first driven configuration, in which the first drive pinion is meshed with the driven gear and the locking device is disengaged, upon pivoting of the engagement assembly about the input shaft in a first direction in response to application of a torque to the input shaft in the first direction; and
   one of the first drive pinion and the driven gear comprises a sprocket and the other of the first drive pinion and the driven gear comprises a series of rollers arranged to form a ring, each roller being rotatable about a roller axis at a fixed distance from an axis of rotation of the drive pinion or driven gear, respectively.

2. The drive system of claim 1, wherein the engagement assembly includes:
   a second intermediate gear meshed with the input gear and rotatable about a second intermediate axis by a second intermediate shaft; and
   a second drive pinion mounted on the second intermediate shaft and rotatable in tandem with the second intermediate gear, one of the second drive pinion and the driven gear comprising a sprocket and the other of the first drive pinion and the driven gear comprising a series of rollers arranged to form a ring, each roller being rotatable about a roller axis at a fixed distance from an axis of rotation of the second drive pinion or driven gear, respectively, and
   wherein the locking device is engageable to prevent rotation of the second intermediate gear about the second intermediate axis, and the drive system is arranged to move from the neutral configuration to a second driven configuration, in which the second drive pinion is meshed with the driven gear and the locking device is disengaged, upon the pivoting of the engagement assembly in a second direction opposite to the first direction in response to application of a torque to the input shaft in the second direction.

3. The drive system of claim 1, including a resilient member arranged to bias the engagement assembly to the neutral configuration.

4. The drive system of claim 1, including a stop member arranged to limit an amount by which the engagement assembly can pivot about the input shaft.

5. The drive system of claim 1, wherein the locking device is engageable with the engagement assembly to prevent rotation of the first intermediate gear, and optionally the second intermediate gear.

6. The drive system of claim 5, wherein the locking device comprises an engagement member arranged to engage the first pinion gear.

7. The drive system of claim 1, wherein the locking device is arranged to automatically disengage in the first driven configuration, and optionally the second driven configuration.

8. The drive system of claim 1, wherein the locking device is arranged to automatically engage in the neutral configuration.

9. The drive system of claim 3, wherein the resilient member comprises a spring having a proximal end attached to the drive assembly and a distal end attached to the engagement assembly.

10. The drive system of claim 9, wherein the distal end is attached to the engagement assembly by a coupling which permits sliding of the distal end relative to the engagement assembly.

11. The drive system of claim 10, wherein the locking device comprises a lever having a first end connected to the distal end of the spring, a second end arranged to engage one or more teeth of the first pinion gear, and a pivot connection between the lever and the engagement assembly, whereby the pivot connection is arranged to permit pivoting of the lever relative to the engagement assembly in response to sliding of the distal end relative to the engagement assembly.

12. An aircraft landing gear having a wheel and a drive system according to claim 1, wherein the driven gear of the drive system is attached to the wheel so that the wheel is arranged to rotate in tandem with the driven gear.

13. A method of operating a drive system to rotate a wheel of a landing gear about a wheel axis, the drive system including: a drive assembly including an input gear rotatable about an input axis by an input shaft; an engagement assembly including a first intermediate gear meshed with the input gear and rotatable about a first intermediate axis by a first intermediate shaft and a first drive pinion mounted on the first intermediate shaft and arranged to rotate in tandem with the first intermediate gear, the engagement assembly being pivotable about the input shaft relative to the drive assembly; a locking device which is engageable to prevent rotation of the first intermediate gear about the first intermediate axis; and a driven gear attached to the wheel so as to be capable of rotating the wheel about the wheel axis, wherein one of the first drive pinion and the driven gear comprises a sprocket and the other of the first drive pinion and the driven gear comprises a series of rollers arranged to form a ring, each roller being rotatable about a roller axis at a fixed distance from an axis of rotation of the drive pinion or driven gear, respectively, the method including the steps of:
   engaging the locking device to prevent rotation of the first intermediate gear about the first intermediate axis;
   applying a torque to the input gear in a first direction to thereby pivot the engagement assembly about the input axis in the first direction to a position in which the first pinion gear is meshed with the driven gear and the locking device is disengaged; and continuing to apply the torque to the input gear in the first direction to rotate the driven gear in the first direction and thereby rotate the wheel about the wheel axis in the first direction.

14. The method of claim 13, further including the step of applying a torque to the input gear in a second direction opposite to the first direction so that the engagement assembly pivots about the input axis in the second direction and the first pinion gear is no longer meshed with the driven gear.

15. The method of claim 13, wherein the engagement assembly further includes: a second intermediate gear meshed with the input gear and rotatable about a second intermediate axis by a second intermediate shaft; and a second drive pinion mounted on the second intermediate shaft and rotatable with the second intermediate gear, one of the second drive pinion and the driven gear comprising a sprocket and the other of the first drive pinion and the driven gear comprising a series of rollers arranged to form a ring, each roller being rotatable about a roller axis at a fixed distance from an axis of rotation of the second drive pinion or driven gear, respectively, and the method includes the steps of:

engaging the locking device to prevent rotation of the second intermediate gear about the second intermediate axis;

applying a torque to the input gear in a second direction opposite to the first direction to thereby pivot the engagement assembly about the input axis in the second direction to a position in which the second pinion gear is meshed with the driven gear and the locking device is disengaged; and continuing to apply the torque to the input gear in the second direction to rotate the driven gear in the second direction and thereby rotate the wheel about the wheel axis in the second direction.

* * * * *